United States Patent [19]
Scott

[11] Patent Number: 5,577,568
[45] Date of Patent: Nov. 26, 1996

[54] SELF-PROPELLED HANDTRUCK

[76] Inventor: Henry E. Scott, 2146 Jimmie-Kerr Rd., Haw River, N.C. 27258

[21] Appl. No.: 429,328

[22] Filed: Apr. 26, 1995

[51] Int. Cl.⁶ .................................................. B62D 51/04
[52] U.S. Cl. ............................................. 180/19.1; 180/11
[58] Field of Search ................................. 180/19.1, 19.3, 180/11, 16

[56] References Cited

U.S. PATENT DOCUMENTS

| | | | |
|---|---|---|---|
| 1,319,438 | 10/1919 | Tolman | 180/19.1 |
| 2,132,069 | 10/1937 | Hall | 280/5.22 |
| 2,674,328 | 4/1954 | Searls | 180/19.1 |
| 2,740,484 | 4/1956 | Montana | 180/19.1 X |
| 3,092,200 | 6/1963 | Chambers | 180/19.1 X |
| 3,205,963 | 9/1965 | Tinker | 180/19.1 |
| 3,370,664 | 2/1968 | Caplan | 180/19.1 X |
| 3,527,314 | 9/1970 | Mistarz | 180/19.1 |
| 5,139,102 | 8/1992 | Pocapalia | 180/19.2 |

*Primary Examiner*—Kevin Hurley
*Attorney, Agent, or Firm*—Rhodes, Coats & Bennett, L.L.P.

[57] ABSTRACT

A self-propelled handtruck including a frame and having at least one driven wheel and at least one non-driven wheel such that the handtruck may be selectively positioned in either a self-propelled position or an operator-propelled position. The frame includes a vertical frame member. A drivetrain mounting structure is secured to the vertical frame member. The drivetrain mounting structure preferably provides for selective positioning of the same along the vertical frame member so that the center of gravity of the handtruck may be varied as desired. A drivetrain is secured to the drivetrain mounting structure, the drivetrain being operable to drive the driven wheel. Preferably, the driven wheel is mounted on the frame of the handtruck by at least one wheel mounting plate. The wheel mounting plate includes one end which is fixedly secured to the vertical frame member. Moreover, the wheel mounting plate may be mounted for selective positioning of the wheel mounting plate along the vertical frame member.

27 Claims, 5 Drawing Sheets

SELF-PROPELLED HANDTRUCK

FIELD OF THE INVENTION

The present invention is directed to handtrucks, and more particularly, to a self-propelled handtruck.

BACKGROUND OF THE INVENTION

Handtrucks are widely used for carrying substantial loads. Conventional handtrucks typically include a frame having vertical posts with handles and a pair of skids or a platform extending forwardly of the posts at a right angle thereto. A pair of wheels arc mounted on either side of the handtruck proximate the intersection of the upright posts and the skids or platform. Although this design of handtruck is highly beneficial for lifting and transporting heavy articles, it still requires a significant amount of work on behalf of the operator who must provide all of the motive force.

To assist the operator in moving handtrucks as described above, a motorized handtruck has been invented and is disclosed in U.S. Pat. No. 3,205,963 to C. D. Tinker. The motorized handtruck disclosed in the Tinker patent includes a conventional handtruck further including a pair of substantially horizontally disposed base struts and a pair of substantially vertically disposed support struts. A second pair of wheels is mounted on an axle which extends between the base struts. The base struts support the driving wheels, the motor, the transmission, the driving connections between the motor and the transmission, and the driving connections between the transmission and the driving wheels. Thus, substantially the entire drivetrain is supported by the base struts which extend outwardly behind the vertical posts of the handtruck frame. As a result, the mass of the motor is disposed a substantial distance from the axle of the front wheels (i.e., the pivot fulcrum), thereby requiring great effort to tilt the motorized handtruck forward to lift the rear wheels off of the ground and/or place the handtruck in an upright position.

Another drawback of the motorized handtruck design disclosed in the patent to Tinker lies in the configuration of the base struts and the supporting struts and their relation to the driven and non-driven wheels. The configuration as disclosed does not provide for good resistance to deflection of the handtruck under load. Also, the driven wheels are not rigidly secured to the frame and the assembly is therefore not as sturdy as a given task may require. Further, the components forming the motorized portions of the handtruck are not easily adaptable for mounting on a variety of handtrucks.

Thus, there exists a need for a self-propelled handtruck which reduces the effort required to tilt the handtruck forward and/or place the handtruck in an upright position. Moreover, there exists a need for such a self-propelled handtruck which provides secure resistance to deflection due to loads when the handtruck is in a tilted, operative position. A need exists for a self-propelled handtruck providing for convenient adjustment of the handtruck's center of gravity. Finally, there exists a need for an assembly for motorizing a handtruck which is easily, conveniently, and cost effectively adaptable for and installable on a variety of conventional handtrucks.

SUMMARY OF THE INVENTION

The present invention is directed to a self-propelled handtruck having at least one non-driven wheel and at least one driven wheel, whereby an operator may selectively operate the handtruck in a conventional operator-propelled mode, or alternatively, operate the handtruck in a self-propelled mode. In the self-propelled mode, both the driven and the non-driven wheels are placed on the ground and the drivetrain serves, via the driven wheels, to propel the handtruck. In the operator-propelled mode, the driven wheels are lifted off of the ground, thereby allowing the handtruck to function in conventional fashion. The handtruck includes a frame having a vertical frame member. A drivetrain mounting structure is secured to the vertical frame member and serves to support a drivetrain. The drivetrain includes a motor and a transmission which are operable to drive the aforesaid driven wheel or wheels.

The driven wheel or wheels may be mounted on the frame by one or more wheel mounting plates, the wheel mounting plate or plates each having one end fixedly secured to the vertical frame member. The wheel mounting plate or plates may be adjustably mounted for selective positioning along the vertical frame member.

The drivetrain mounting structure preferably includes a drivetrain mounting plate. The drivetrain mounting plate includes means for securing the drivetrain to the drivetrain mounting plate. The means for securing the drivetrain to the drivetrain mounting plate may include a plurality of bores arranged and configured to secure the motor and the transmission to the drivetrain mounting plate. The drivetrain mounting structure is further provided with means for securing the drivetrain mounting structure to the vertical frame. The means for securing the drivetrain mounting structure to the vertical frame of the handtruck may include one or more brackets extending outwardly from the drivetrain mounting plate. Moreover, means may be provided for adjustability of the drivetrain mounting plate such that the drivetrain mounting plate may be selectively positioned along the vertical frame member.

An object of the present invention to provide a self-propelled handtruck.

An object of the present invention is to provide a self-propelled handtruck which may be utilized in conventional, non-driven fashion, or alternatively, as a motorized handtruck having supplemental drive means.

An object of the present invention is to provide such a handtruck which further requires reduced effort by the operator to raise the driven wheels from the ground, thereby placing the handtruck in a non-driven mode.

Moreover, and in furtherance of the foregoing object, an object of the present invention is to provide such a handtruck which provides for convenient and effective adjustment and positioning of the handtruck's center of gravity.

Additionally, it is an object of the present invention to provide a self-propelled handtruck which allows adjustment of the distance between driven and non-driven wheels of the handtruck.

Moreover, it is an object of the present invention to provide a motorizing assembly which may be easily and conveniently modified for and installed on a variety of conventional handtrucks.

Yet another object of the present invention is to provide a motorized handtruck having secure means for resisting collapse of the handtruck due to loads on the handtruck when the handtruck is in a tilted, driven mode.

The preceding and further objects of the present invention will be appreciated by those of ordinary skill in the art from a reading of the figures and the detailed description of the preferred embodiment which follow, such description being merely illustrative of the present invention.

DETAILED DESCRIPTION OF THE PREFERRED EMBODIMENT

Figure 1:
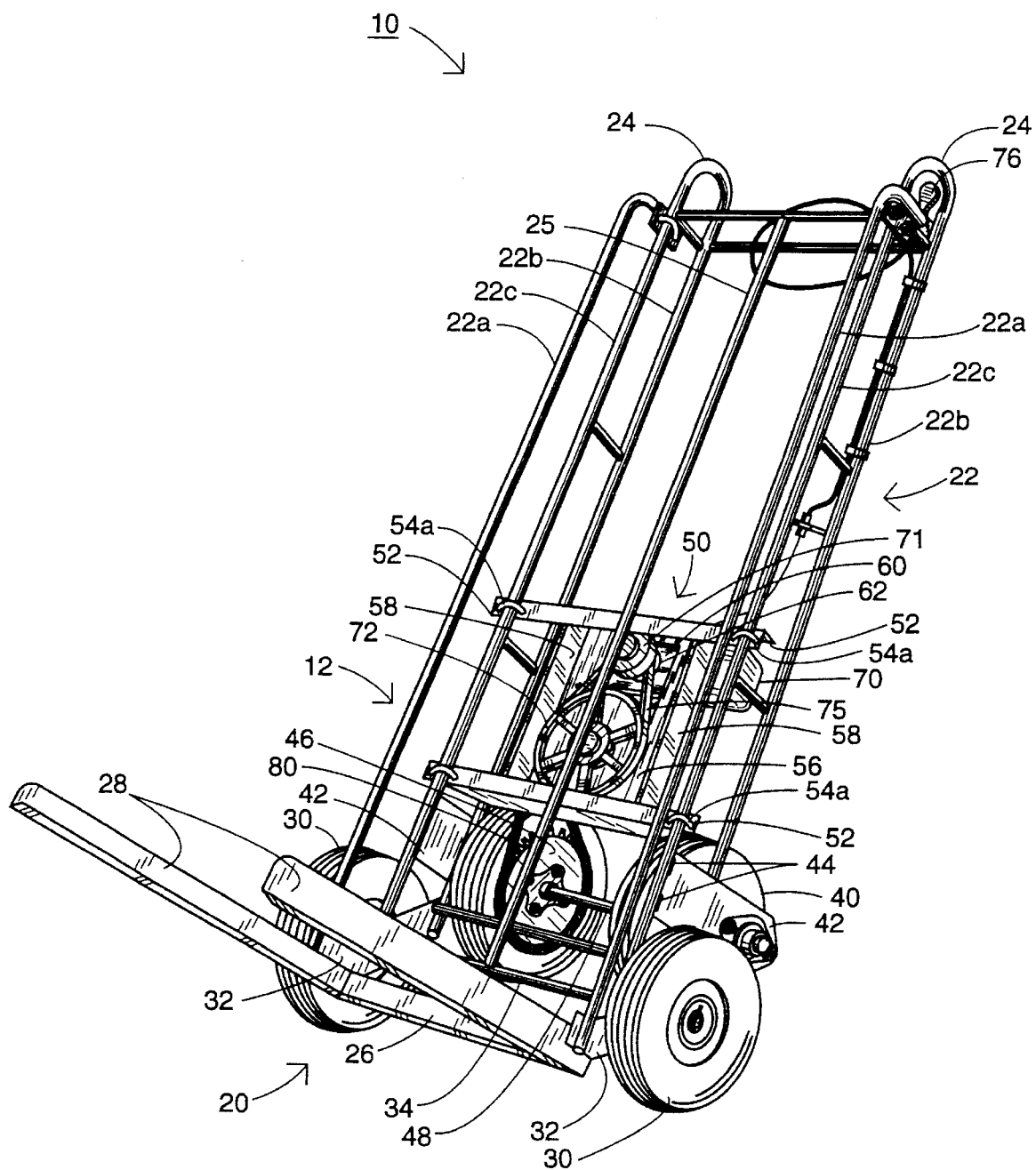
FIG. 1 is a perspective view of a self-propelled handtruck according to the present invention.
Figure 2:
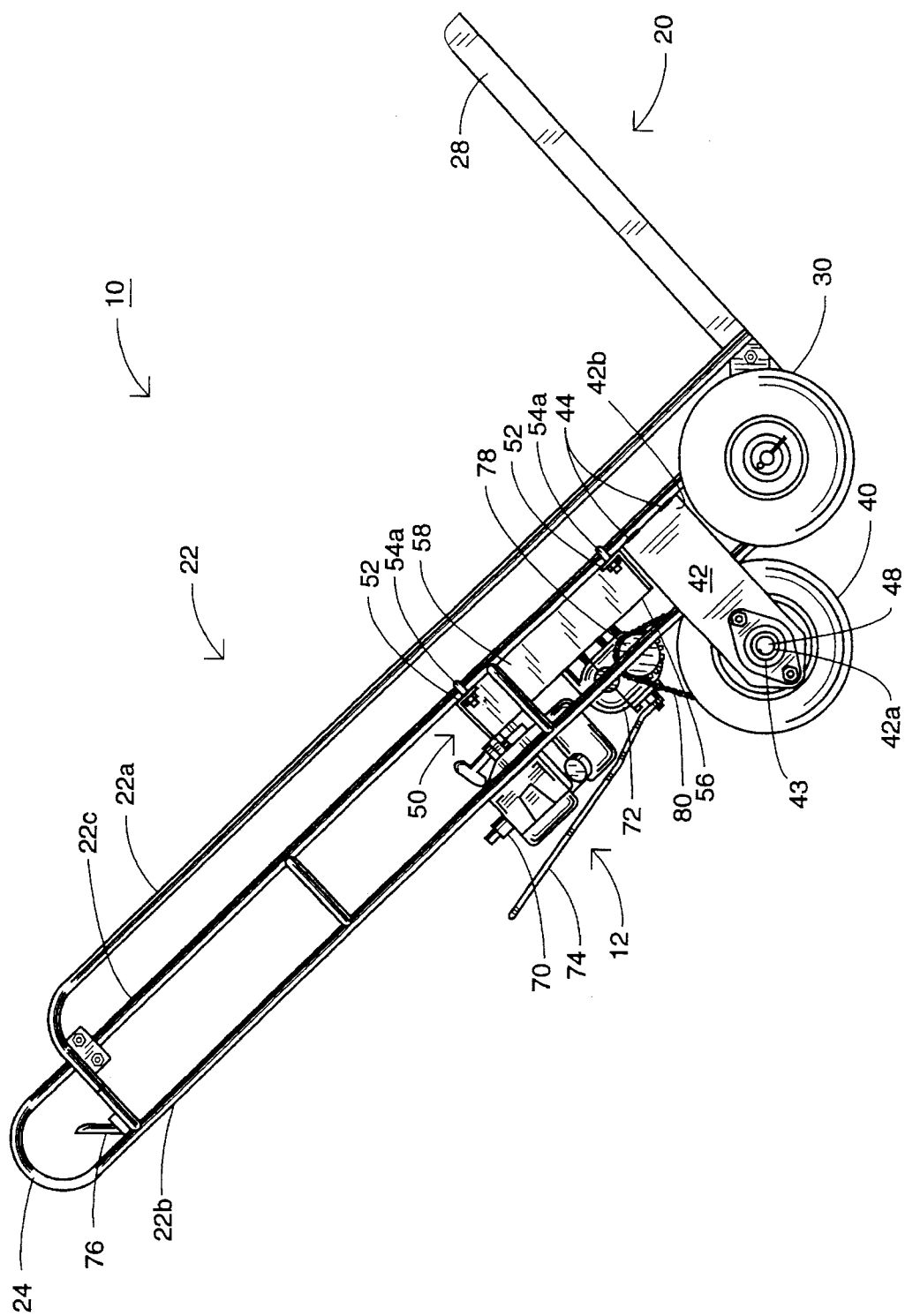
FIG. 2 is a side elevational view of the self-propelled handtruck wherein all of the wheels are on the ground.
Figure 3:
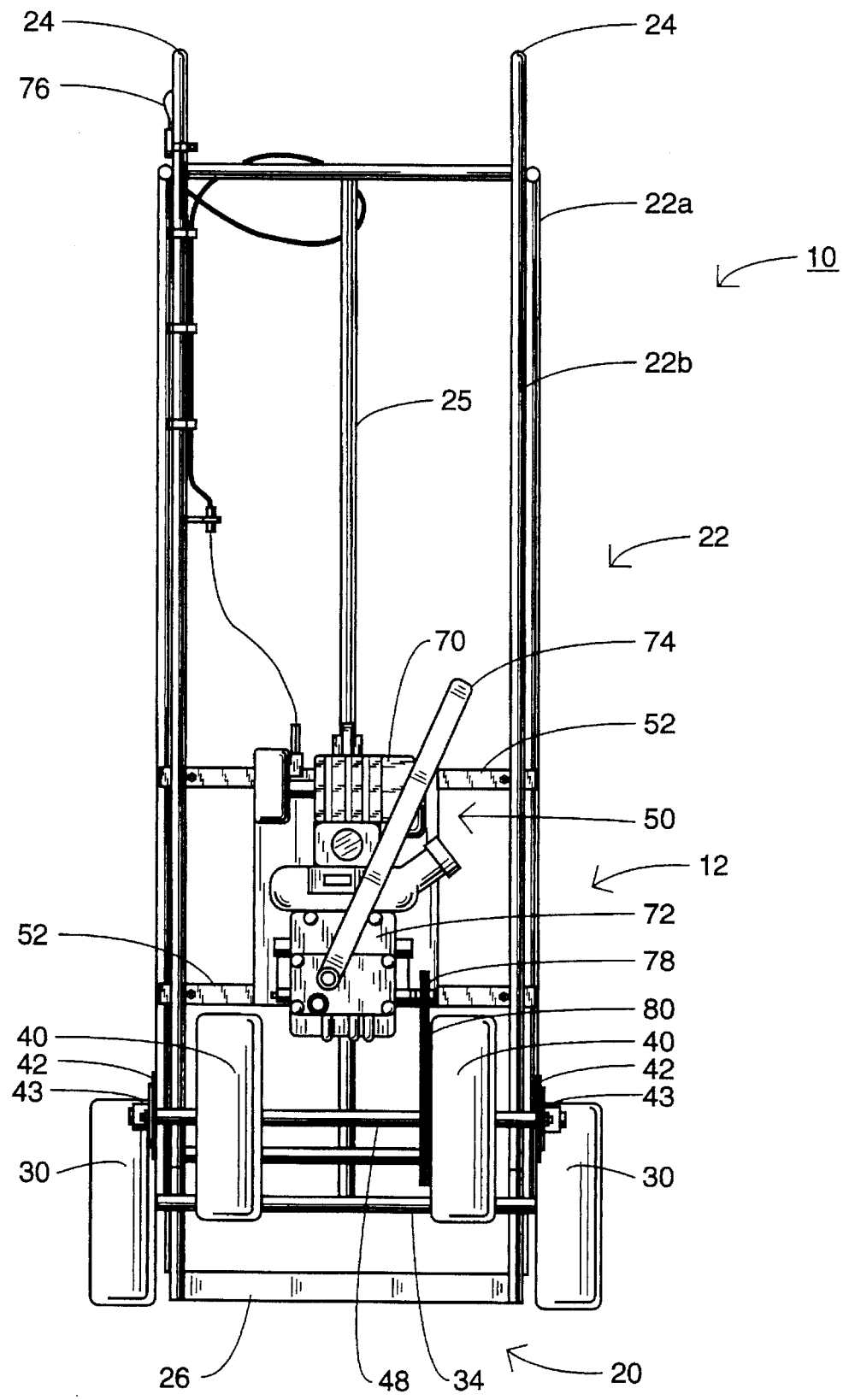
FIG. 3 is a rear elevational view of the self-propelled handtruck in an upright, stored position.

With particular reference to FIGS. 1–3, a self-propelled handtruck according to the present invention, generally denoted by the numeral 10, is shown therein. Handtruck 10 includes frame 20 to which are mounted front wheels 30, rear wheels 40 and drivetrain 12.

Frame 20 may be any suitable handtruck frame. Frame 20 includes vertical frame 22 which includes front posts 22a, rear posts 22b, and middle posts 22c. Vertical frame 22 further includes center post 25. Skids 28 extend outwardly and forwardly from vertical frame 22, preferably forming an angle of about 90° therebetween. Cross member 26 is provided between skids 28 and proximate the base of vertical frame 22 to connect the left and right sides of frame 20 and to provide rigidity thereto. Handles 24 are provided at the top of vertical frame 22 on either side to allow operator manipulation of the handtruck.

In conventional fashion, handtruck 10 includes front wheel mounting plates 32 mounted between front posts 22a and respective skids 28 as shown. Front wheel mounting plates 32 include apertures (not shown) formed therein. The ends of axle 34 are rotatably mounted in and through respective apertures. Front wheels 30 are mounted on respective ends of axle 34 for rotative movement with respect to frame 20. So mounted, front wheels 30 are free to roll in conventional fashion.

Figure 5:
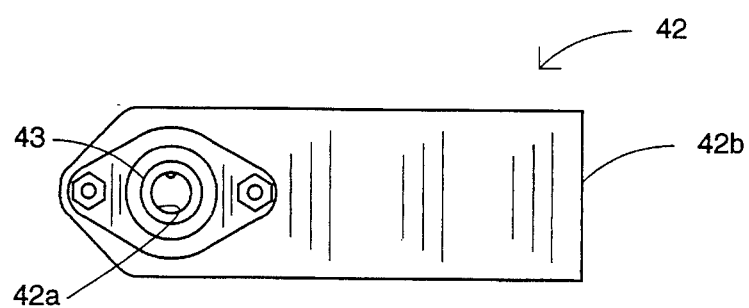
FIG. 5 is a side elevational view of a rear wheel mounting plate forming a part of the self-propelled handtruck according to the present invention.

Rear wheel mounting plates 42, as best seen in FIG. 5, each include an aperture 42a, a bearing 43 and an attachment end 42b. Rear wheel mounting plates 42 are secured to respective rear posts 22b at their attachment ends 42b by, for example, welds 44. Axle 48 extends between rear wheel mounting plates 42 with each end thereof extending through an aperture 42a and rotatively mounted in a bearing 43. Rear wheels 40 are fixedly secured on axle 48 proximate respective ends thereof and interiorly of mounting plates 42. Driven sprocket 48 is fixedly secured to axle 48, preferably interiorly of rear wheel mounting plates 42 as well.

Figure 4:
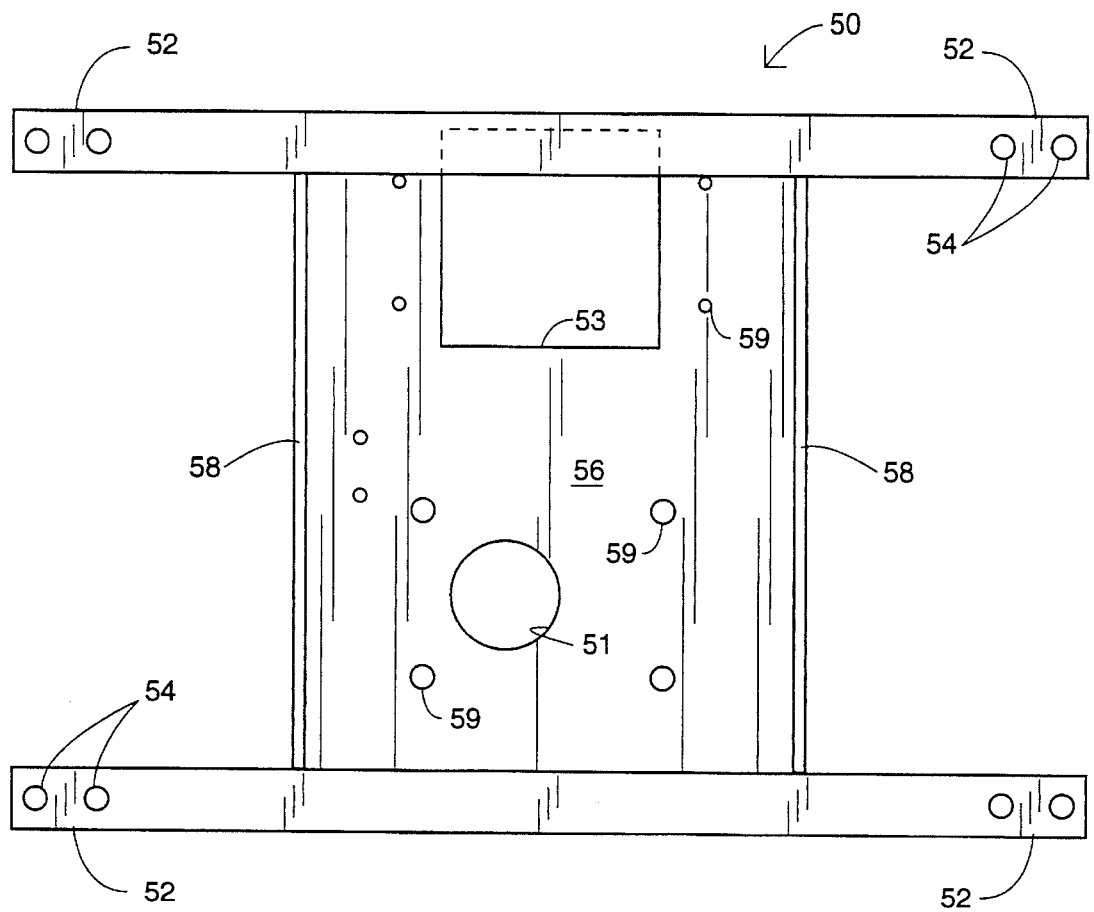
FIG. 4 is a front elevational view of the drivetrain mounting structure forming a part of the present invention.

With particular reference to FIG. 4, drivetrain mounting structure 50 is shown therein. Drivetrain mounting structure 50 includes mounting plate 56 in which a plurality of bores 59 and cutouts 51,53 are formed. Bores 59 may be formed in any configuration suitable for mounting the components of the drivetrain as discussed below, including the motor and the transmission. Cutouts 51 and 53 are sized to receive shafts from the transmission and the motor, respectively. A second, U-shaped plate 60 is preferably provided for mounting the motor to drivetrain mounting structure 50. Plate 60 is provided with hole 62 for receiving the motor shaft therethrough. Mounting plate 56 is surrounded by peripheral side walls 58 which extend frontwardly thereby surrounding transmission pulley 73, motor pulley 71, and belt 75. Brackets 52 extend outwardly and preferably laterally from mounting plate 56 on either side. A pair of bores 58 are formed in each of brackets 52. With particular reference to FIG. 3, drivetrain mounting structure 50 is secured to middle posts 22c of frame 20 by means of U-bolts 54a through bores 58, each of U-bolts 54a surrounding its respective post.

Drivetrain 12 includes motor 70 and transmission 72, each of which are fixedly mounted to mounting plate 56. Motor 70 may be any suitable motor or engine, preferably a combustion engine. For example, motor 70 may be a Homelite Weedeater, 30 cc two cycle motor. Two cycle engines are preferred for their relative compactness and light weight. Transmission 72 may likewise be any suitable transmission such as used in conventional riding lawnmowers, for example, a Peerless transmission having five forward speeds and one reverse speed. The output of motor 70 is controllable by means of throttle lever 76 mounted on handle 24. Transmission 72 is preferably provided with two or more gear sizes with shift lever 74 provided for gear selection. Moreover, transmission 72 preferably includes one or more forward gears, a reverse gear, and a neutral setting. Transmission 72 may have gear ratios of 7:1 (first), 4.5:1 (second), 3.0:1 (third), 2.4:1 (fourth), 2:1 (fifth), and 5:1 (reverse).

Motor 70 is operative to drive pulley 71 which drives pulley 73 by means of belt 75. Pulley 73 is secured to the input shaft of transmission 72 which rotatively drives drive sprocket 78. Drive sprocket 78 in turn drives driven sprocket 46 by means of chain 80. Because driven sprocket 46 is fixedly secured to axle 48 and rear wheels 40 are fixedly secured to axle 48 as well, actuation of motor 70 and engagement of transmission 72 will result in a driving force at rear wheels 40.

Handtruck 10 may be assembled using a conventional handtruck as described above. Rear wheel mounting plates 42 are secured to posts 22b,22c by welding such that axle 48 having rear wheels 40 and driven sprocket 46 thereon is suspended between plates 42. Drivetrain mounting structure 50 is mounted on vertical frame 22 by securing brackets 52 to front posts 22a by means of U-bolts 54a. Motor 70 and transmission 72 are mounted on mounting plate 56 by means of bolts or welding, for example. The position of drivetrain mounting structure 50, and thus the drivetrain, along vertical frame 22 may be adjusted as desired by loosening U-bolts 54a, sliding drivetrain mounting structure 50 along vertical frame 22, and re-tightening U-bolts 54a. It will be appreciated that the components as described above may be provided as a kit for retrofitting conventional handtrucks.

Handtruck 10 may be utilized as follows.

When there is no load or a light load on frame 20, and the operator desires simply to use his own motive three to transport the handtruck and article, the operator need only tilt frame 20 forward about front wheels 30 a sufficient distance to lift rear wheels 40 off of the ground. In this non-driven mode, handtruck 10 will operate more or less as a conventional handtruck.

When the handtruck operator is carrying a heavier load, and wishes to take advantage of the drivetrain, he or she need only tilt frame 20 back about front wheels 30 to engage rear wheels 40 with the ground. Once handtruck 10 has been placed in this position, the operator may start motor 70 and/or (if motor 70 is already running) engage transmission 72 by means of throttle 76 which engages a centrifugal clutch (not shown). Handtruck 10 with the load thereon will then be propelled by means of drivetrain 12 and rear wheels 40 in a forward or reverse direction as selected by means of shift lever 74.

It will be appreciated that the self-propelled handtruck according to the present invention provides certain advantages over conventional, non-powered handtrucks and motorized handtrucks according to the prior art. Because drivetrain 12, and particularly motor 70 and transmission 72 are located in close relation to vertical frame 22 and the axis of pivot (i.e., axle 34), reduced effort by the operator is required to tilt handtruck 10 forward into the non-driven mode. This is particularly advantageous inasmuch as it may often be desirable to transport handtruck 10 in the non-driven position relatively long distances.

Also, the combination of motor 70 and transmission 72 allows for the utilization of a compact, lightweight two-cycle motor. The relatively low torque of such motors may be compensated for by the gear ratio selections of the transmission.

A further benefit of handtruck 10 according to the present invention results from the mounting means utilized, namely, drivetrain mounting structure 50. Drivetrain mounting structure 50 provides a relatively simple and convenient, as well as cost effective, means for mounting the various components of drivetrain 12 on frame 20. Further, drivetrain mounting structure 50 lends itself to modification and/or supplementation such that it may be mounted to a wide variety of configurations and shapes of conventional handtrucks and, further, may be modified for receiving varied shapes and sizes of drivetrain components. The drivetrain mounting structure serves to stabilize the handtruck frame, particularly with respect to lateral deflection. This is particularly advantageous where the drivetrain is retro-fitted to a conventional handtruck which is not designed for the extra weight and loads attributable to the drive assembly.

Because drivetrain mounting structure 50 can be easily repositioned along vertical frame 22, the weight distribution or center of gravity of handtruck 10 may be conveniently readjusted as desired to optimize the useability of the handtruck as needed.

It will be further appreciated that rear wheel mounting plates 42 provide certain advantages in the manufacture and functionality of handtruck 10. In particular, assembly of handtruck 10 is facilitated by the provision of this simple, convenient and effective means for mounting rear wheels 40 on frame 20. Moreover, such mounting is relatively secure and takes advantage of geometries and suitable available mounting means, such as welding and bolting, to provide a framework which is highly resistant to deformation due to heavy loading of the handtruck.

Figure 6:
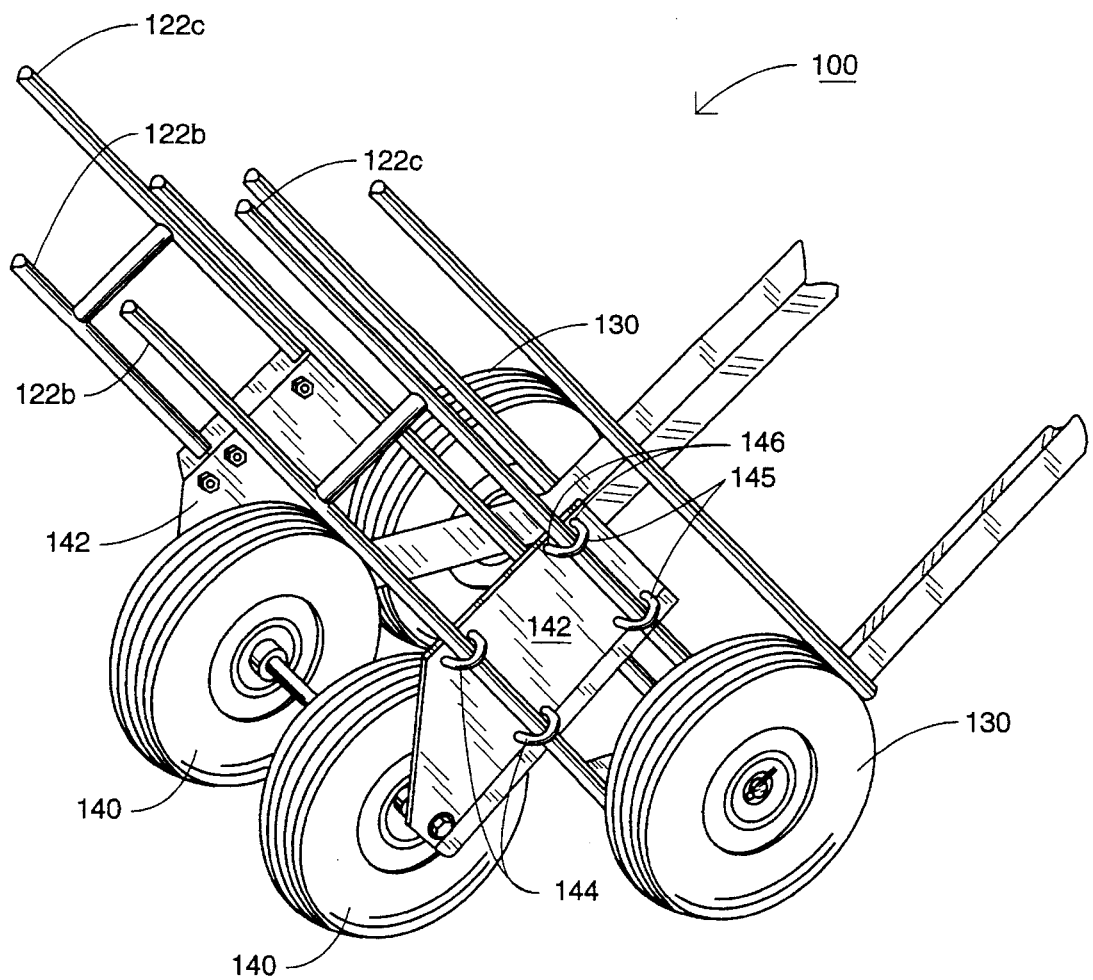
FIG. 6 is a side elevational view of a handtruck including a rear wheel mounting plate according to a second embodiment of the present invention.

With reference to FIG. 6, a handtruck 100 including rear wheel mounting plates 142 according to a second embodiment of the present invention is shown therein. Handtruck 100 is substantially the same as handtruck 10 as described above except that rear wheel mounting plates 142 provide for adjustable positioning of rear wheels 140 along posts 122b,122c of the handtruck frame. Plates 142 each include bores 146 through which respective U-bolts 145 extend. Plates 142 may be repositioned along posts 122b,122c by loosening U-bolts 145, sliding plates 142 along posts 122b, 122c, and re-tightening U-bolts 145. In this way, the operator may readjust the distance between the front and rear wheels and the degree of tilt from vertical required to place the rear wheels in contact with the ground.

It will be appreciated that other re-fastenable means may be used in place of the aforementioned U-bolts.

The present invention may, of course, be carried out in other specific ways than herein set forth without departing from the spirit and essential characteristics of the invention. For example, the drivetrain mounting structure and the rear wheel mounting plates may be interconnected so that they may be repositioned along the frame as a unit. The present embodiments are, therefore, to be considered in all respects as illustrative and not restrictive, and all changes coming within the meaning and equivalency range of the appended claims are intended to be embraced therein.

What is claimed is:

1. A self-propelled handtruck, comprising:

a) a frame including a vertical frame member;

b) at least one first wheel mounted on said frame for free rotation with respect to said frame;

c) a drivetrain mounting structure secured to said vertical frame member;

d) at least one second wheel rotatably mounted on said frame; and e) a drivetrain secured to said drivetrain mounting structure and operable to drive said at least one second wheel.

f) wherein said drivetrain mounting structure is mounted substantially parallel with said vertical frame member and is adjustably mounted on said vertical frame member for selective positioning therealong.

2. The self-propelled handtruck of claim 1 wherein said second wheel is mounted on said frame by at least one wheel mounting plate, said wheel mounting plate having one end fixedly secured to said vertical frame member.

3. The self-propelled handtruck of claim 1 wherein said second wheel is mounted on said frame by at least mounting plate, and wherein said wheel mounting plate includes means for adjustably mounting said wheel mounting plate on said vertical frame member for selectively positioning therealong.

4. A drivetrain mounting structure for mounting a drivetrain on a vertical frame member of a handtruck, said drivetrain mounting structure comprising:

a) a drivetrain mounting plate, said drivetrain mounting plate including means for securing the drivetrain to said drivetrain mounting plate: and b) means for securing said drivetrain mounting structure to the vertical frame member such that said drivetrain mounting structure is slidable along said vertical frame member.

5. The drivetrain mounting structure of claim 4 wherein said means for securing said drivetrain mounting structure to the vertical frame member include at least one bracket extending outwardly from said drivetrain mounting plate.

6. The drivetrain mounting structure of claim 4 wherein said means for securing the drivetrain to said drivetrain mounting plate includes a plurality of bores arranged and configured to secure a motor and a transmission to said drivetrain mounting plate.

7. A self propelled handtruck, comprising:

a) a frame including a vertical frame member;

b) at least one first wheel mounted on said frame for free rotation with respect to said frame;

c) a drivetrain mounting structure secured to said vertical frame member, said drivetrain mounting structure comprising:

i) a drivetrain mounting plate, said drivetrain mounting plate including means for securing a drivetrain to said drivetrain mounting plate; and ii) means for securing said drivetrain mounting structure to said vertical frame member such that said drivetrain mounting structure is slidable along said vertical frame member;

d) at least one second wheel rotatably mounted on said frame; and e) wherein said drivetrain is secured to said drivetrain mounting plate and is operable to drive said at least one second wheel.

8. The self-propelled handtruck of claim 7 wherein said second wheel is mounted on said frame by at least one wheel mounting plate, said wheel mounting plate having one end fixedly secured to said vertical frame member.

9. The self-propelled handtruck of claim 7 wherein said second wheel is mounted on said frame by at least one wheel mounting plate, and wherein said wheel mounting plate includes means for adjustably mounting said wheel mounting plate on said vertical frame member for selective positioning therealong.

10. The self-propelled handtruck of claim 7 wherein said means for securing said drivetrain mounting structure to said vertical frame member includes at least one bracket extending outwardly from said drivetrain mounting plate.

11. The self-propelled handtruck of claim 7 wherein said drivetrain includes a motor and a transmission, and wherein said means for securing said drivetrain to said drivetrain mounting plate include a plurality of bores arranged and configured to secure said motor and said transmission to said drivetrain mounting plate.

12. A kit for converting a conventional handtruck to a self-propelled handtruck, the conventional handtruck including a frame having a vertical member, and at least a pair of first wheels mounted on the frame for free rotation with respect to the frame, said kit comprising:

a) a drivetrain mounting structure adapted to be secured to the vertical frame member, said drivetrain mounting structure comprising:
i) a drivetrain mounting plate, said drivetrain mounting plate including means for securing a drivetrain to said drivetrain mounting plate; and
ii) means for securing said drivetrain mounting structure to the vertical frame member:

b) at least a pair of second wheels adapted to be rotatably mounted on the frame; and c) wherein said drivetrain is adapted to be secured to said drivetrain mounting plate and is operable to drive said second wheels.

13. The kit of claim 12 wherein said means for securing said drivetrain mounting structure to the vertical frame member is adapted to allow selective positioning of said drivetrain mounting structure along the vertical frame member.

14. The kit of claim 12 further including at least one wheel mounting plate for mounting said second wheels on the frame, said wheel mounting plate having one end adapted to be fixedly secured to the vertical frame member.

15. The kit of claim 12 further including at least one wheel mounting plate for mounting said second wheels on the frame, and wherein said wheel mounting plate includes means for adjustably mounting said wheel mounting plate on the vertical frame member for selective positioning therealong.

16. The kit of claim 12 wherein said means for securing said drivetrain mounting structure to the vertical frame member includes at least one bracket extending outwardly from said drivetrain mounting plate.

17. The kit of claim 12 wherein said drivetrain includes a motor and a transmission, and wherein said means for securing said drivetrain to said drivetrain mounting plate include a plurality of bores arranged and configured to secure said motor and said transmission to said drivetrain mounting plate.

18. A self-propelled handtruck, comprising:

a) a frame including a vertical frame member;

b) at least one first wheel mounted on said frame for free rotation with respect to said frame:

c) at least one second wheel rotatably mounted on said frame;

d) a drive train secured to said frame and operable to drive said at least one second wheel; and e) wherein said second wheel is mounted on said frame by at least one wheel mounting plate, said wheel mounting plate having one end fixedly secured to said vertical frame member.

19. A self-propelled handtruck, comprising:

a) frame including a vertical frame member;

b) at least one first wheel mounted on said frame for free rotation with respect to said frame;

c) at least one second wheel rotatably mounted on said frame;

d) drivetrain secured to said frame and operable to drive said at least one second wheel: and e) wherein said second wheel is mounted on said frame by at least one wheel mounting plate, said wheel mounting plate including means for adjustably mounting said wheel mounting plate on said vertical frame member for selective positioning therealong.

20. A self-propelled handtruck, comprising:

a) a frame including a vertical frame member;

b) at least one first wheel mounted on said frame for free rotation with respect to said frame;

c) a drivetrain mounting structure secured to said vertical frame member;

d) at least one second wheel rotatably mounted on said frame by at least one wheel mounting plate, said wheel mounting plate including means for adjustably mounting said wheel mounting plate on said vertical frame member for selective positioning therealong: and e) a drivetrain secured to said drivetrain mounting structure and operable to drive said at least one second wheel.

21. A self propelled handtruck, comprising:

a) a frame including a vertical frame member;

b) at least one first wheel mounted on said frame for free rotation with respect to said frame:

c) a drivetrain mounting structure secured to said vertical frame member, said drivetrain mounting structure comprising:
i) a drivetrain mounting plate, said drivetrain mounting plate including means for securing a drivetrain to said drivetrain mounting plate; and
ii) means for securing said drivetrain mounting structure to said vertical frame member;

d) at least one second wheel rotatably mounted on said frame by at least one wheel mounting plate, said wheel mounting plate including means for adjustably mounting said wheel mounting plate on said vertical frame member for selective positioning therealong; and e) wherein said drivetrain is secured to said drivetrain mounting plate and is operable to drive said at least one second wheel.

22. A kit for converting a conventional handtruck to a self-propelled handtruck, the conventional handtruck including a frame having a vertical member, and at least one first wheel mounted on the frame for free rotation with respect to the frame, said kit comprising:
   a) a drivetrain mounting structure adapted to be secured to the vertical frame member, said drivetrain mounting structure comprising:
      i) a drivetrain mounting plate, said drivetrain mounting plate including means for securing a drivetrain to said drivetrain mounting plate; and
      ii) means for securing said drivetrain mounting structure to the vertical frame member;
   b) at least one second wheel adapted to be rotatably mounted on the frame;
   c) at least one wheel mounting plate for mounting said second wheel on the frame, said wheel mounting plate including means for adjustably mounting said wheel mounting plate on the vertical frame member for selective positioning therealong; and
   d) wherein said drivetrain is adapted to be secured to said drivetrain mounting plate and is operable to drive said at least one second wheel.

23. A self-propelled handtruck, comprising:
   a) a frame including a vertical frame member;
   b) at least one first wheel mounted on said frame for free rotation with respect to said frame;
   c) a drivetrain mounting structure secured to said vertical frame member;
   d) at least one second wheel rotatably mounted on said frame by at least one wheel mounting plate, said wheel mounting plate having one end fixedly secured to said vertical frame member; and
   e) a drivetrain secured to said drivetrain mounting structure and operable to drive said at least one second wheel.

24. A drivetrain mounting structure for mounting a drivetrain on a vertical frame member of a handtruck, said drivetrain mounting structure comprising:
   a) a drivetrain mounting plate, said drivetrain mounting plate including means for securing the drivetrain to said drivetrain mounting plate; and
   b) means for securing said drivetrain mounting structure to the vertical frame member, said means for securing said drivetrain mounting structure to the vertical frame member including at least one bracket extending outwardly from said drivetrain mounting plate, said at least one bracket being fixedly secured to said drivetrain mounting plate.

25. A self-propelled handtruck, comprising:
   a) a frame including a vertical frame member;
   b) at least one first wheel mounted on said frame for free rotation with respect to said frame;
   c) a drivetrain mounting structure secured to said vertical frame member, said drivetrain mounting structure comprising:
      i) a drivetrain mounting plate, said drivetrain mounting plate including means for securing a drivetrain to said drivetrain mounting plate; and
      ii) means for securing said drivetrain mounting structure to said vertical frame member;
   d) at least one second wheel rotatably mounted on said frame by at least one wheel mounting plate, said wheel mounting plate having one end fixedly secured to said vertical frame member; and
   e) wherein said drivetrain is secured to said drivetrain mounting plate and is operable to drive said at least one second wheel.

26. A self propelled handtruck, comprising:
   a) a frame including a vertical frame member;
   b) at least one first wheel mounted on said frame for free rotation with respect to said frame;
   c) a drivetrain mounting structure secured to said vertical frame member, said drivetrain mounting structure comprising:
      i) a drivetrain mounting plate, said drivetrain mounting plate including means for securing a drivetrain to said drivetrain mounting plate; and
      ii) means for securing said drivetrain mounting structure to said vertical frame member, said means for securing said drivetrain mounting structure to said vertical frame member including at least one bracket extending outwardly from said drivetrain mounting plate, said at least one bracket being fixedly secured to said drivetrain mounting plate;
   d) at least one second wheel rotatably mounted on said frame; and
   e) wherein said drivetrain is secured to said drivetrain mounting plate and is operable to drive said at least one second wheel.

27. A kit for converting a conventional handtruck to a self-propelled handtruck, the conventional handtruck including a frame having a vertical member, and at least one first wheel mounted on the frame for free rotation with respect to the frame, said kit comprising:
   a) a drivetrain mounting structure adapted to be secured to the vertical frame member, said drivetrain mounting structure comprising:
      i) a drivetrain mounting plate, said drivetrain mounting plate including means for securing a drivetrain to said drivetrain mounting plate; and
      ii) means for securing said drivetrain mounting structure to the vertical frame member, said means for securing said drivetrain mounting structure to the vertical frame member including at least one bracket extending outwardly from said drivetrain mounting plate, said at least one bracket being fixedly secured to said drivetrain mounting plate;
   b) at least one second wheel adapted to be rotatably mounted on the frame; and
   c) wherein said drivetrain is adapted to be secured to said drivetrain mounting plate and is operable to drive said at least one second wheel.

* * * * *